United States Patent [19]
Frank et al.

[11] Patent Number: 6,021,470
[45] Date of Patent: *Feb. 1, 2000

[54] METHOD AND APPARATUS FOR SELECTIVE DATA CACHING IMPLEMENTED WITH NONCACHEABLE AND CACHEABLE DATA FOR IMPROVED CACHE PERFORMANCE IN A COMPUTER NETWORKING SYSTEM

[75] Inventors: Richard Frank, Groton, Mass.; Gopalan Arun, Nashua, N.H.; Richard Anderson, Nashua, N.H.; Rabah Mediouni, Nashua, N.H.; Stephen Klein, Hollis, N.H.

[73] Assignee: Oracle Corporation, Redwood Shores, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/819,673

[22] Filed: Mar. 17, 1997

[51] Int. Cl.[7] .............................. G06F 12/00; G06F 13/00
[52] U.S. Cl. ...................... 711/138; 711/118; 711/130; 711/133; 711/136; 711/139; 711/154; 711/159; 711/160; 395/200.33; 395/200.43; 707/201
[58] Field of Search ................................. 711/3, 118, 122, 711/130, 133, 136, 138, 139, 154, 159, 160; 395/200.3, 200.33, 200.43, 200.53; 707/200

[56] References Cited

U.S. PATENT DOCUMENTS

| | | | |
|---|---|---|---|
| 4,433,374 | 2/1984 | Hanson et al. | 711/138 |
| 4,740,889 | 4/1988 | Motersole et al. | 711/138 |
| 5,210,847 | 5/1993 | Thome et al. | 711/138 |
| 5,235,642 | 8/1993 | Wobber et al. | 380/25 |
| 5,247,639 | 9/1993 | Yamahata | 711/138 |
| 5,452,447 | 9/1995 | Nelson et al. | 707/205 |
| 5,511,208 | 4/1996 | Boyles et al. | 395/200.53 |
| 5,572,700 | 11/1996 | Hays et al. | 711/139 |
| 5,586,296 | 12/1996 | Bernstein et al. | 711/138 |
| 5,594,863 | 1/1997 | Stiles | 395/182.13 |
| 5,606,687 | 2/1997 | Mehring et al. | 711/139 |
| 5,625,793 | 4/1997 | Mirza | 711/138 |
| 5,682,514 | 10/1997 | Yohe et al. | 711/118 |
| 5,706,435 | 1/1998 | Barbará et al. | 711/141 |

Primary Examiner—Tuan V. Thai
Attorney, Agent, or Firm—Wagner Murabito & Hao

[57] ABSTRACT

A method for selectively caching data in a computer network. Initially, data objects which are anticipated as being accessed only once or seldomly accessed are designated as being exempt from being cached. When a read request is generated, the cache controller reads the requested data object from the cache memory if it currently resides in the cache memory. However, if the requested data object cannot be found in the cache memory, it is read from a mass storage device. Thereupon, the cache controller determines whether the requested data object is to be cached or is exempt from being cached. If the data object is exempt from being cached, it is loaded directly into a local memory and is not stored in the cache. This provides improved cache utilization because only objects that are used multiple times are entered in the cache. Furthermore, processing overhead is minimized by reducing unnecessary cache insertion and purging operations. In addition, I/O operations are minimized by increasing the likelihood that hot objects are retained in the cache longer at the expense of infrequently used objects.

19 Claims, 4 Drawing Sheets

METHOD AND APPARATUS FOR SELECTIVE DATA CACHING IMPLEMENTED WITH NONCACHEABLE AND CACHEABLE DATA FOR IMPROVED CACHE PERFORMANCE IN A COMPUTER NETWORKING SYSTEM

FIELD OF THE INVENTION

The present invention pertains to a method for selectively caching data objects to improve the cache performance in a computer system.

BACKGROUND OF THE INVENTION

Computers have become an integral tool used in a wide variety of different applications, such as in finance and commercial transactions, three-dimensional and real-time graphics, computer-aided design and manufacturing, healthcare, telecommunications, education, etc. Computers are finding new applications as their performance and speeds ever increase while costs decrease due to advances in hardware technology and rapid software development. Furthermore, a computer system's functionality and usefulness can be dramatically enhanced by coupling stand-alone computers together to form a computer network. In a computer network, users may readily exchange files, share information stored on a common database, pool resources, communicate via e-mail and even video teleconference.

One popular type of network setup is known as "client/server" computing. Basically, users perform tasks through their own dedicated desktop computer (i.e., the "client"). The desktop computer is networked to a larger, more powerful central computer (i.e., the "server"). The server acts as an intermediary between a group of clients and a database stored in a mass storage device. An assortment of network and database software enables communication between the various clients and the server. Hence, in a client/server arrangement, the data is easily maintained because it is stored in one location and maintained by the server; the data can be shared by a number of local or remote clients; the data is easily and quickly accessible; and clients may readily be added or removed.

Normally, vast amounts of data are stored in the form of one or more databases residing on a number of hard disk drives of a disk array coupled to the server. The main advantages for storing data in this fashion is because it is relatively inexpensive and because the data is retained even when power is turned off. However, accessing this data can take a relatively long time due to the electro-mechanical nature of hard disk drives. First, the appropriate disk within one of the hard disk drives must be rotated to the desired sector corresponding to the data that is to be read or written. In addition, the servomechanism must move the actuator assembly to place the transducer to the correct track. Only then can the data be written to or read from the disk. Often, data is scattered in many different locations and multiple seeks must be performed for a single read or write operation. Given that a transaction might entail initiating numerous read/write operations, the cumulative time required in performing disk I/O operations can add up to become quite substantial. Hence, having to perform numerous disk I/O operations acts as a bottleneck in the flow of data. As a result, it drastically slows down the overall performance of the computer system.

In an effort to reduce the time required to access data, client/server computer systems have now incorporated a section of "cache" memory. Typically, the cache memory is comprised of banks of random access memory (RAM) chips. Hence, data can be accessed electronically rather than electromechanically. Hence cache access can be performed at extremely fast speeds. Another advantage is that implementing a global cache memory allows data to be shared and accessed by multiple users. But since cache memory is volatile, most of the data is stored in the disk array. Furthermore, cache memory costs more than an equivalent amount of hard disk memory. Consequently, the capacity of the cache memory is smaller than that of the disk array. Hence, there is only a limited amount of data which can be retained in the cache at any given time.

Due to the restricted size of the cache memory, it is important to utilize it efficiently. The efficiency of a cache system depends on how often the requested data can be found in the cache. If the requested data currently resides in the cache (i.e., a "hit"), the data is simply retrieved from the cache. On the other hand, if the requested data does not currently reside in the cache (i.e., a "miss"), it must be read from the hard disk drive, thereby requiring a relatively slow disk I/O operation. Moreover, before the new entry can be cached, an existing entry must be written back to the disk array to make room for the new entry. Writing back the older entry requires another disk I/O operation. Consequently, cache misses are highly undesirable because they take a relatively long time to process. Therefore, it would be highly preferable for cache systems if the hit rate can somehow be increased while the number of misses is minimized.

The present invention provides a solution for improving the efficiency of a cache system by selectively caching data objects. The present inventors have discovered that with modern computer systems, every data object that is accessed is also typically cached. However, it is often the case that some data objects will not be used more than once. In these cases, the data objects tend to clutter the cache and might even cause more useful data to be purged from the cache. By keeping these once-only type data objects from being globally cached, the present invention allows better cache utilization, reduced processing overhead, and improved overall performance.

SUMMARY OF THE INVENTION

The present invention pertains to a method for selectively caching data in a computer network. Initially, data objects which are anticipated as being accessed only once or seldomly accessed are designated as being exempt from being cached. The exemption of data objects from being cached can be specified on a user basis. A data object can be a page, a record, a field, or some other unit of data. In the currently preferred embodiment, this selection is made by a database administrator. The database administrator sets one or more flags in an application program. The flags are set to indicate whether data objects are to be exempt from being cached. When a read request is generated, the cache controller checks the cache memory to determine whether the requested data object currently resides in the cache memory. If the requested data object exists in the cache memory, it is retrieved. However, if the requested data object cannot be found in the cache memory, it is read from a mass storage device.

Thereupon, the cache controller determines whether the requested data object is exempt from being cached. If the data object is exempt from being cached, it is loaded directly into a local memory and is not stored in the cache. Otherwise, the data object is cached as normal. This selective caching process of the present invention provides improved cache utilization because objects that are used multiple times are entered in the cache, whereas infrequently used objects are excluded from being stored in the cache. Furthermore, processing overhead is minimized by reducing unnecessary cache insertion and purging operations. In addition, I/O operations are minimized by increasing the likelihood that hot objects are retained in the cache longer at the expense of infrequently used objects.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method for selectively caching objects in a computer network is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
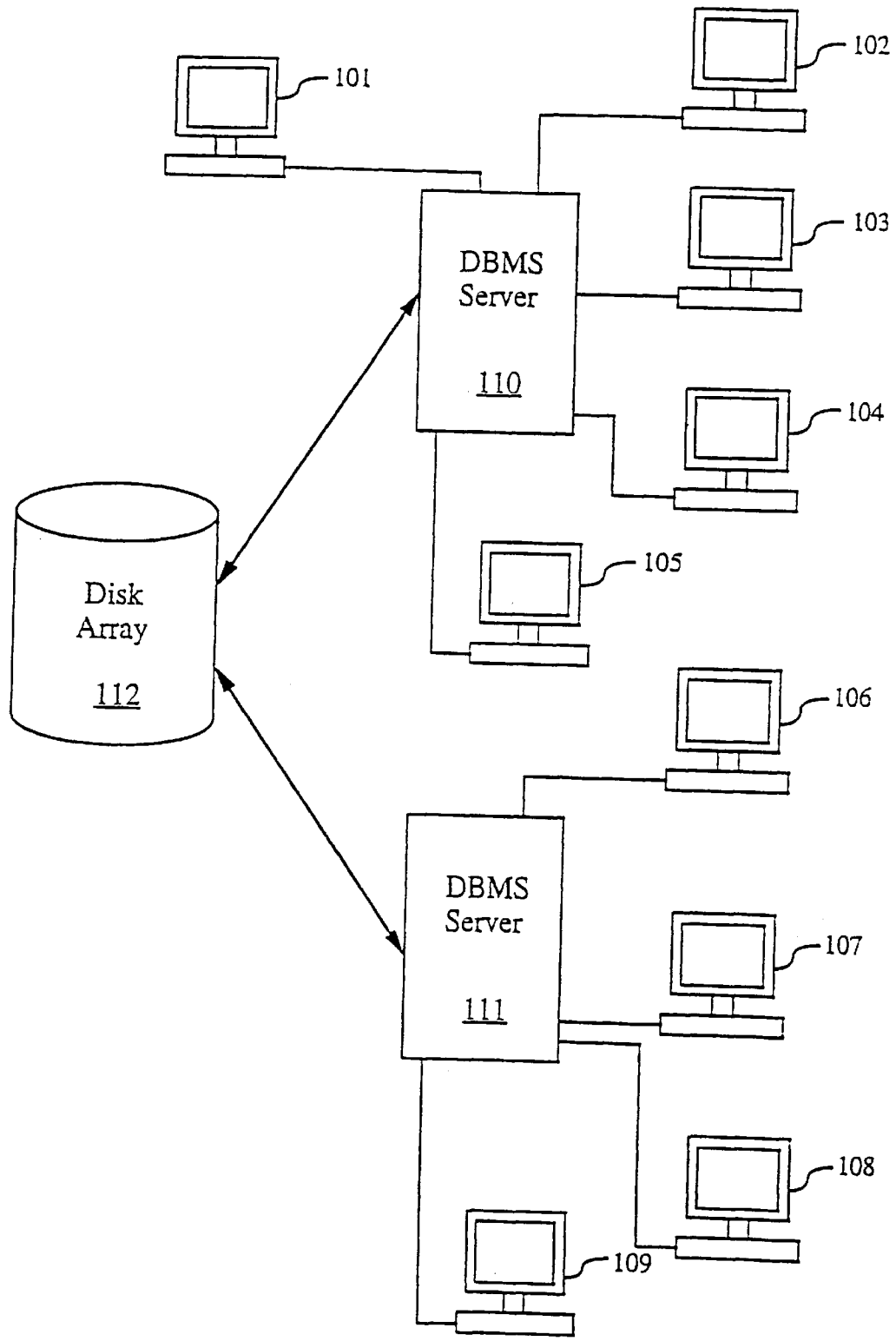
FIG. 1 shows a block diagram of a client server system upon which the present invention may be practiced.

Referring to FIG. 1, a block diagram of a client server system upon which the present invention may be practiced is shown. The system may incorporate a number of client computers 101–109 (e.g., personal computers, workstations, portable computers, minicomputers, terminals, etc.). Running on each of the clients 101–109 are one or more applications. An application is a software program which instructs the computer to perform certain tasks. Some examples of applications include programs for handling payroll, tracking inventory, performing human resources, etc. In turn, the clients 101–109 are serviced by one or more servers. Two such servers are shown as 110 and 111. Servers 110 and 111 are comprised of more powerful PC's, workstations, mainframes, etc. The function of the servers 110–111 is to handle transactions received from the various clients 101–109. This is accomplished by various client programs, known as "processes, workers, threads, etc.," running on the servers 110–111. Some examples of client processes include graphical user interfaces, tools for generating reports, tools for defining and manipulating data, etc.

Although each of the servers 110 and 111 has its own dedicated portion of memory, they also interface with a large commonly shared storage area, such as a disk array 112. A disk array 112 can take the form of a combination of hard disk drives, optical drives, tape drives, etc. In this manner, vast amounts of data are capable of being stored economically in the form of relational databases residing within disk array 112. This data is accessible to and shared amongst clients 101–109 via either of the servers 110 and 111 as follows. Initially, a server receives a request generated by an application running on one of the clients. Accordingly, a server process is assigned to handle this request by retrieving the desired data within the appropriate databases. When the data is retrieved, the application can then manipulate the data according to its program. Furthermore, the user may choose to either change the data or enter new data. Subsequently, the new or updated data may be written back to the database via the client. However, read/write operations to/from disk array 112 take a relatively long time to perform. Hence, a small portion of cache memory is implemented within each of the servers 110–111.

Figure 2:
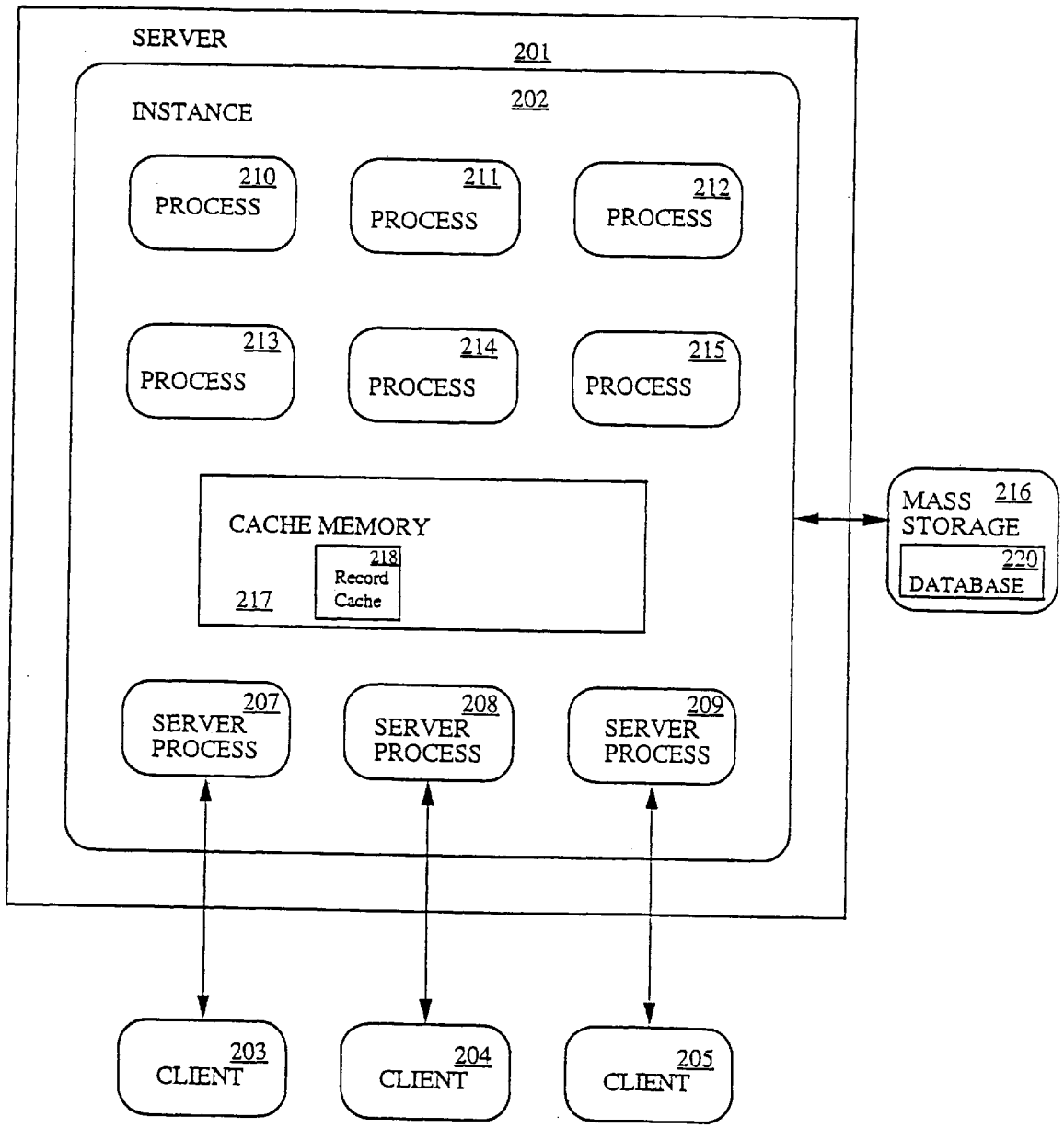
FIG. 2 shows a block diagram of a database stored on a disk array or equivalent mass storage system and a client server system having a cache memory.

FIG. 2 shows a block diagram of a database 220 stored on a disk array or equivalent mass storage system 206 and a client server system having a cache memory 219. Server 201 includes a shared database management system (DBMS). A DBMS is a piece of software that manages access to a database 220. Basically, a data base is a collection of related files containing information. These files are stored in hardware in a mass storage device, such as in a disk drive array 206. One or more databases may be stored in disk drive array 206. A DBMS "mounts" a particular database in order to access tables of information contained within the files associated with that database. Thereby, data stored in the form of tables in a relational database residing in the disk drive array 206 are accessible to any of the clients 203–205 via server 201. The computer programs or processes running on server 201 are used to interact with the clients 203–205 and to manipulate the relational database data in the disk drive array 206. For purposes of consistency, the term "process" is used extensively in this detailed description to refer to programs or sets of code running on a server. One particular kind of process, referred to as a server process, receives requests generated by client applications. This server process interacts with other processes and with the client applications to service the client applications' requests.

An instance 202 of the DBMS running on server 201 acts as an interface between clients 203–205 and a database residing within mass storage 206. An instance 202 is a particular execution of the DBMS on server 201. Applications, such as payroll, inventory, human resources, etc., running on clients 203–205 interact with a corresponding server process 207–209. When a user logs on to a client, a connection is established between that client and server 201; one or more server processes are then spawned. These server processes, together with other dedicated processes 210–215 (e.g., rollback, log writing, system monitor, etc.), perform the requested tasks (e.g., fetch data, store data, edit data, etc.) with respect to the database 220.

Within server 201 is a dedicated cache memory 217. Cache memory 217 consists of random access memory, either static (SRAM) or dynamic (DRAM). The most recent data read from database 220 is stored in cache memory 217. This can be accomplished on either a page or record basis. In other words, a page of data consisting of 2 Kbytes, 4 Kbytes, or 8 Kbytes of data can be cached. Similarly, the cache operation can be performed by caching records corresponding to one or more rows of information comprising all the data elements stored in a table. The records are cached in a record cache 218. Subsequently, any of the clients 203 may access the data by retrieving it from the cache memory 217 rather than having to perform an I/O operation to read the data from the disk array 206. Whenever the data is currently being processed by one of the clients 203–205, it is "locked" to prevent other clients from gaining access to that data. Once the data has been processed, the updated data is then written back to the cache memory 217. Periodically, the most recent data stored in cache memory 217 is checkpointed back to the database 220 of disk array 206. If the requested data does not currently reside in cache memory 217, a portion of the cache memory may be written back to the database 220 or "flushed" in order to make space available for the new incoming data. Typically, the least recently used (LRU) data is flushed. The new data can then be written to the cache memory 217.

However, it has been discovered that it is often the case that some data objects are used only a few times or only once. These once-only data objects tend to clutter the cache memory 217 and/or record cache 218. Furthermore, the cache system suffers additional processing overhead to handle the cache operations associated with these once-only data objects. In addition, caching these once-only data objects forces other data objects currently stored in the cache to be flushed in order to make space available to the once-only data objects. In an LRU scheme, the least recently used data objects are flushed, even though they may be needed later. Once flushed, the data objects are purged and are no longer retained in the cache memory 217. If the flushed data objects are subsequently requested by one of the clients 203–205, they must be read back from the disk array 206. Hence, it has been discovered that caching data objects which are used only once or used very infrequently degrades the hit rate because other more relevant data might be flushed out of the cache.

In recognition of this discovery, the present invention differentiates between data objects. A data object includes a page, a record, a field, or any unit of allocation of data in the cache system. With the present invention, data objects are not all automatically cached whenever they are read. Some objects are cached, whereas other objects are not cached. The callers of the cache system have the capability to directly state their caching intentions on an individual object basis. This is accomplished by modifying a standard cache process so that it is receptive to specialized caching information supplied by an application program. Eventually, the updated contents of the cache memory are written back to the disk array by executing a checkpoint procedure.

For a read operation, the cache process calls the cache system to determine whether the requested data object is already stored in the cache. If the data object currently resides in the cache, it is merely read from the cache. The data is then supplied to the application process. However, if the requested data object is not found in the cache memory, rather than automatically loading the requested data object into the cache memory from the disk array, the present invention allows data objects to either be cached or bypassed from the cache. The determination as to whether a data object is to be cached is made according to the application program. The application program contains information instructing the cache process to either cache a specific data object or not to cache that data object by means of setting a flag. Essentially, the flag acts as a relative "priority" indicator. If the flag is set, select data object(s) corresponding to the flag, are exempt from being cached. As such, the data object(s) are directly read from the disk array and passed on for use by the requesting application program. Otherwise, if the flag is not set, the corresponding data object(s) are cached according to normal caching procedures. It should also be noted that certain application programs may be made so that none of the data used by these programs are cached. An example of one such application program is the "report writer."

In the currently preferred embodiment, this cache/no cache information is input to the application program by a database administrator. The database administrator can inhibit data objects from being cached on either a process, table, transaction type, record, or profile basis. The criteria considered by the database administrator as to whether a data object is to be cached includes the likelihood that the data object is to be shared by multiple clients and/or applications and how often the data object will be accessed. If it is anticipated that a data object is to be used only once and is not used globally, the database administrator instructs the cache process to exempt that particular data object from being stored into the cache. Instead, the data object is loaded directly into the local memory, such as a client's page buffer.

For example, a history writer application is used to provide a summary of a day's, week's, or month's transactions. In order to provide the summary, vast amounts of records must be compiled. Hence, thousands of tables must be read. In the past, these tables were all cached. However, with the present invention, since the tables are only used once, the database administrator may choose to bypass the cache. This eliminates the cache being clogged with tables for servicing the history writer. Another example relates to a report generator application. The function of the report generator is to generate reports, such as sales reports, inventory lists, product schedules, etc. In order to generate the desired reports, the report generator must read the relevant data. But once the report is generated, the data is probably not immediately needed anymore. In this case, the database administrator sets the flag in the report generator to indicate that the relevant records not be cached. In an alternative embodiment, the application is pre-programmed and encoded with information regarding which data objects are exempt from being cached. For instance, a history writer application is programmed so that the records it reads are automatically not cached. This eliminates the requirement of having a database administrator make decisions on a real-time basis on whether to bypass the cache.

Figure 3:
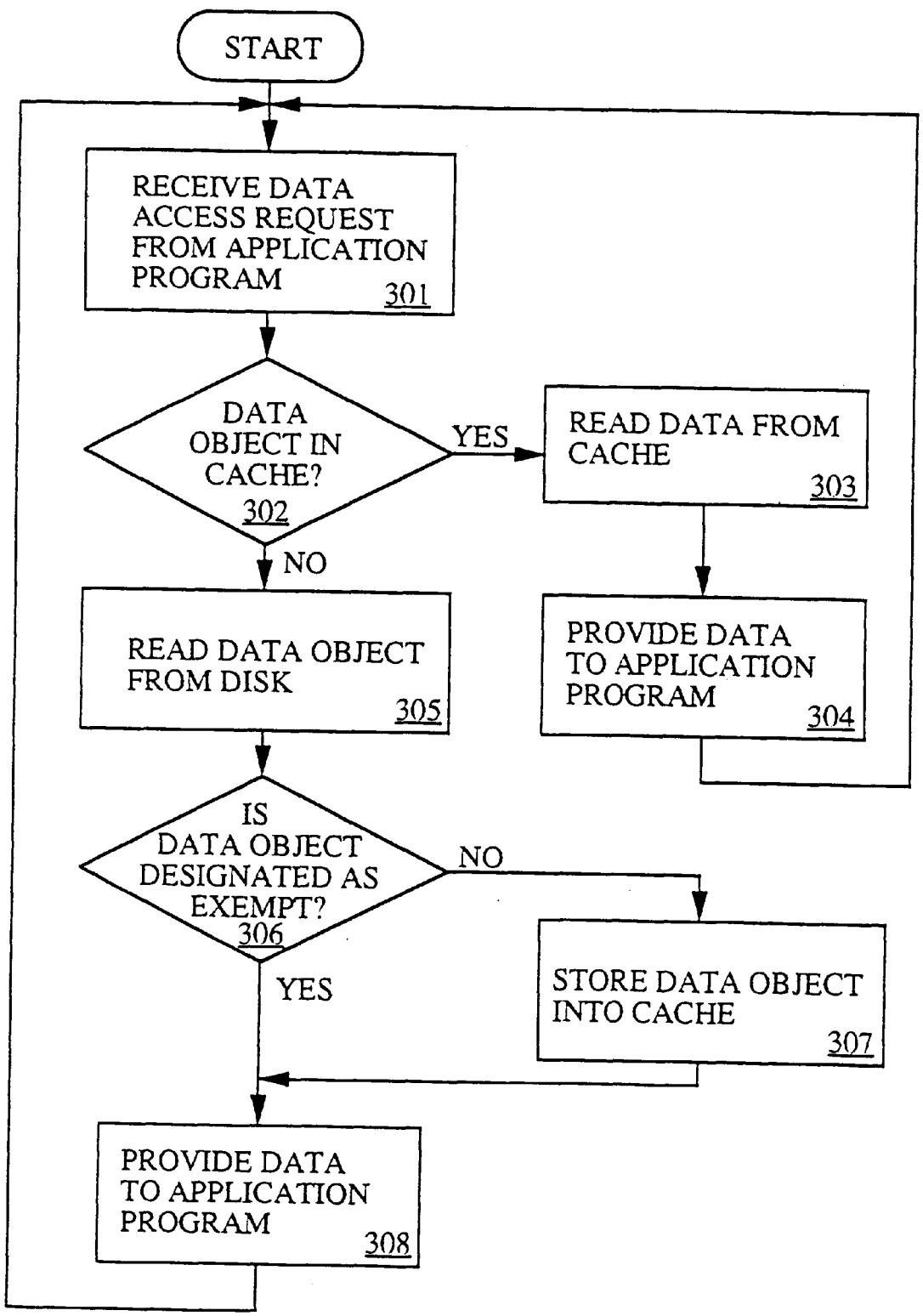
FIG. 3 is a flowchart describing the steps for performing a application controlled caching according to the currently preferred embodiment of the present invention.

FIG. 3 is a flowchart describing the steps for performing a application controlled caching according to the currently preferred embodiment of the present invention. Initially, the server receives a data access request from an application program, step 301. The server determines whether the data object(s) associated with such a request are currently stored in the cache, step 302. If the data object(s) are located in the cache, they are simply read from the cache and provided to the application program, steps 303 and 304. However, if the requested data object(s) cannot be found in the cache, the data object(s) are read from the disk array, step 305. Thereupon, a determination is made as to whether the data object(s) have been designated as being exempt, step 306. If the data object(s) are not exempt, they are then stored into the cache, step 307. Otherwise, the cache is bypassed and the data is sent directly to the requesting application program, step 308.

Figure 4:
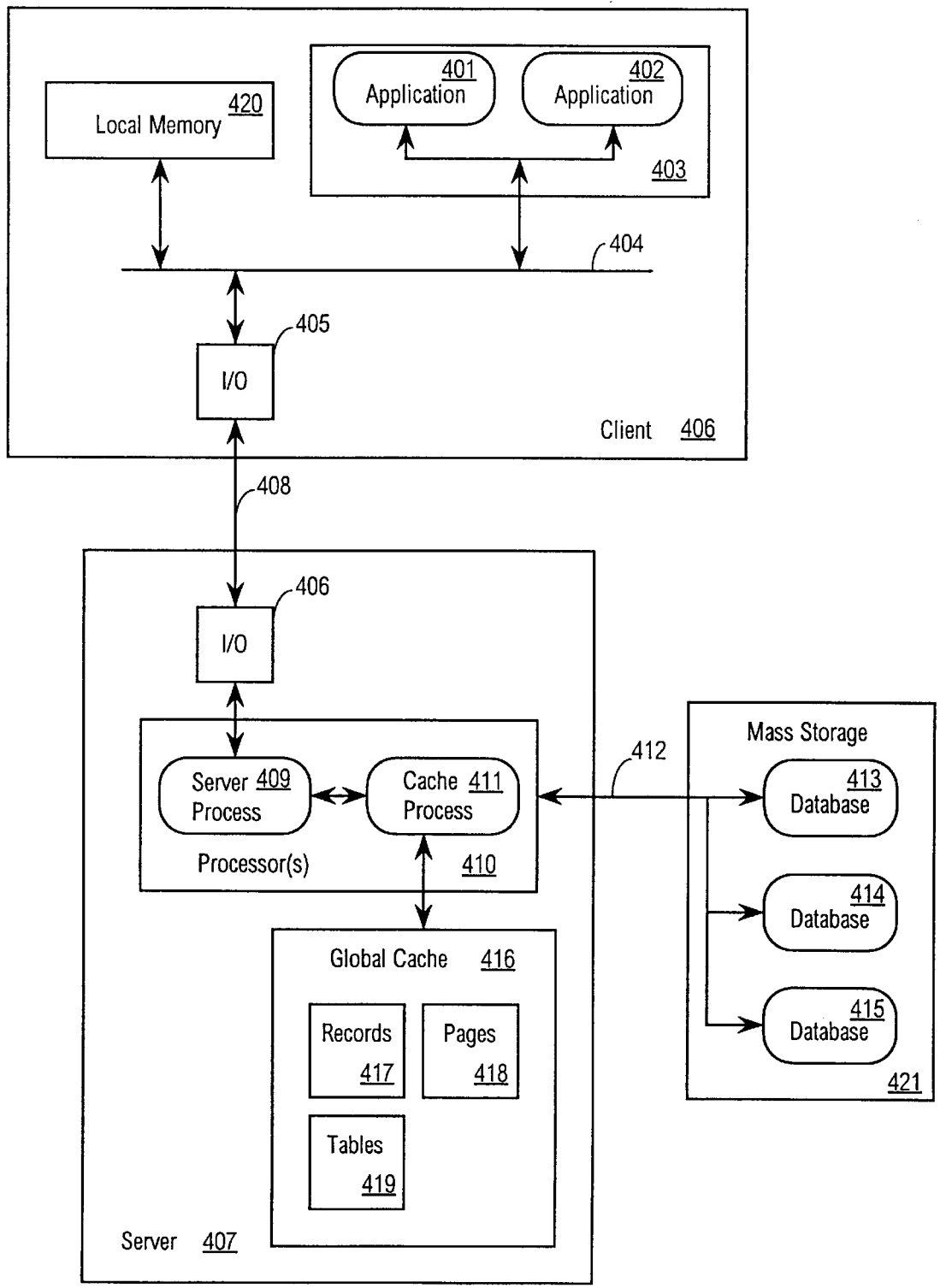
FIG. 4 shows a block diagram of the various components involved in implementing a selective application controlled cache system.

FIG. 4 shows a block diagram of the various components involved in implementing a selective application controlled cache system. One or more applications 401–402 running on one or more microprocessors 403 of client computer 406 is instructed by the database administrator to exempt designated data objects from being cached. One of the application programs 401–402 eventually initiates a read request. The read request is sent to the I/O block 405 via bus 404. The read request is output to a receiving I/O block 406 of server computer 407 over a network connection 408. The server process 409 running on one of the processors 410 in server 407 handles the read request. First, server process 409 consults cache process 411 to determine whether the requested data object is currently stored in the global cache 416. Cache process 411 also runs on one of the processors 410 within server 407. The function of cache process 411 is to manage the global cache 416. Global cache 416 can be segmented into pages 418, records 417, or tables 419. If the requested data object exists in global cache 416, the cache process 411 reads the requested data object from global cache 416. The requested data object is then sent by server process 409 to the server I/O block 406. Eventually, the requested data object received by the client I/O block 405 is temporarily stored in a local memory 420. Thereby, the requesting application 401 or 402 can retrieve the requested data object from local memory via bus 404 for processing. It should be noted that the client 406 can also have its own local cache memory (i.e., SRAM) section in addition to a main memory (i.e., DRAM).

However, if the requested data object cannot be found in global cache 416, the cache process 411 reads the data from the appropriate database 413–415 of mass storage device 421. Databases 413–415 may be relational databases. The data is read over line 412. Thereupon, cache process 411 determines whether the data object is to be cached. This determination is made based on the information supplied by the application program 401 or 402 requesting the data. If it is determined that the data object is to be cached, cache process 411 stores the data object to global cache 416. If the object is stored in the global cache, it does not need to be stored in the client's local memory. All clients can directly access the server's global memory. Otherwise, if it is determined that the data object is exempt from being cached, it is not stored into global cache 416. Instead, the data object is directly routed to the client's local memory 420.

Thereby, this application-controlled caching invention provides improved cache utilization because data objects which are used multiple times are entered in the cache in favor of data objects which are seldomly used. Furthermore, processing overhead is minimized because unnecessary cache insertion and purging operations are reduced by eliminating certain data objects from being cached. In addition, the present invention improves the overall speed of the computer system by improving the hit rate. A higher hit rate directly translates into less I/O operations being performed. The higher hit rate is achieved because selectively caching certain data objects improves the likelihood that "hot" data objects (e.g., data objects which are frequently accessed) will stay in the cache longer by not having to share cache memory with infrequently used data objects.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for selectively caching data in a computer network, comprising steps of:

indicating particular data as exempt from being cached when said particular data has a specified characteristic, said specified characteristic being something other than main memory address location of said particular data;

receiving a request from an application program running on a first computer system for a set of data, said request indicating whether said set of data is exempt;

determining whether said set of data resides within a random access memory of the first computer system;

in response to a determination that said set of data resides within said random access memory:

retrieving said set of data from said random access memory; and providing said set of data to said application program;

in response to a determination that said set of data does not reside within said random access memory:

retrieving said set of data from a mass storage device residing apart from said first computer system;

determining from said request whether said set of data is exempt;

in response to a determination that said set of data is not exempt:

storing said set of data from said mass storage device into said random access memory of said first computer system; and providing said set of data to said application program running on the first computer system;

in response to a determination that said set of data is exempt:

providing said set of data to said application program running on the first computer system without storing said set of data into the random access memory;

if a second application running on a second computer system coupled to the computer network requests the set of data:

providing the set of data to the second application program and storing the set of data in a second random access memory of the second computer system if the set of data is not exempt, otherwise not storing the set of data into the second random access memory of the second computer system if the set of data is exempt;

wherein selecting the data that is to be exempt solely depend on an individual object basis, wherein the individual object includes choices of a page, a record, a field and a table; and said data which is designated as being exempt from being cached before it is retrieved is to be used only one time within a given time span, and said request by said application program indicate exempt data designation in a single operation.

2. The method of claim 1 further comprising the step of instructing said application program to exempt said particular data from being cached based on said specified characteristic of the data.

3. The method of claim 2, wherein a database administrator selects which data is to be exempt from being cached based on said specified characteristic of the data.

4. The method of claim 2 further comprising the step of setting a flag by said application program corresponding to said particular data requested by said application program to indicate that the particular data is to be exempt from being cached.

5. The method of claim 1 further comprising the step of retaining data which are more likely to be accessed in favor of data which are seldom used by not caching the seldom used data at any time.

6. The method as recited in claim 1 wherein said specified characteristic is a type of application program for reading or writing said particular data.

7. The method as recited in claim 1 wherein said specified characteristic is that the data is to be shared by multiple clients and applications.

8. In a computer network, an apparatus for selectively caching data, comprising:
- a first client computer coupled to the computer network for running an application program, wherein the first client computer includes a first local memory;
- a second client computer coupled to the computer network for running the application program, wherein the second client computer includes a second local memory;
- a mass storage device coupled to the computer network for storing data; and a server computer coupled to the first client computer, the second client computer and the mass storage device for handling read requests generated by the application program running on the first client computer and the second client computer, wherein the server computer is comprised of:
- a cache memory for temporarily storing data; and
- a cache controller coupled to the cache memory for controlling the cache memory, wherein requested data not currently residing in the cache memory is read from the mass storage device and selectively:
  - (a) stored in the cache memory of the server computer if said request for data indicates the data is not exempt from being cached;
  - (b) not stored in the cache memory of the server computer and stored into the first local memory of the first client computer if said request for data indicates the data is exempt from being cached; and
  - (c) not stored in the cache memory of the server computer and stored into the second local memory of the second client computer if said request for data indicates the data is exempt from being cached;
- wherein selecting the data that is to be exempt solely depend on an individual object basis, wherein the individual object includes choices of a page, a record, a field and a table; and
- said data which is designated as being exempt from being cached before it is retrieved is to be used only one time within a given time span, and said request by said application program indicates exempt data designation in a single operation.

9. The apparatus of claim 8, wherein the application program is programmed to exempt particular data from being cached.

10. The apparatus of claim 9, wherein a flag corresponding to said particular data is set in the application program to indicate that the particular data is to be exempt from being cache.

11. The apparatus of claim 8, wherein a database administrator selects which data is to be exempt from being cached.

12. The apparatus of claim 8, wherein data which is more likely to be accessed is retained in the cache in favor of data which is seldom used by not caching the seldom used data.

13. In a cache controller for controlling a cache memory in a computer network, a method for selectively caching data objects in the computer network, comprising steps of:
- detecting a first read request generated by an application program running on a first client computer coupled to the computer network, wherein the first client computer includes a first local memory;
- detecting a second read request generated by the application program running on a second client computer coupled to the computer network, wherein the second client computer includes a second local memory, said first and said second read request indicating whether data object sought is exempt from being cached based on a predetermined data characteristic other than main memory address location of said particular data object;
- determining whether a requested data object is currently stored within the cache memory contained in a server computer coupled to the computer network;
- retrieving the requested data object from a cache memory of the server computer if the requested data object is currently stored within the cache memory;
- if the requested data object is not currently stored in the cache memory of the server computer:
- accepting the requested data read from a mass storage device coupled to the computer network;
- determining whether the requested data object is to be cached in the cache memory of the server computer based on said predetermined data characteristic of the data object:
- caching the requested data object in the cache memory of the server computer from said mass storage device if the requested data object has been designated to be cached; and
- if the requested data object has been designated not to be cached:
  - (a) not caching the requested data object in the cache memory of the server computer; and
  - (b) storing the requested data object in the first local memory of the first client computer or the second local memory of the second client;
- wherein selecting the data object that is to be exempt solely depend on an individual object basis, wherein the individual object includes choices of a page, a record, a field and a table; and
- said data object which is designated as being exempt from being cached before it is retrieved is to be used only one time within a given time span, and said request by said application program indicates exempt-data-object designation in a single operation.

14. The method of claim 13 further comprising the step of accepting instruction from said application program as to whether the requested data object is to be cached, based on said specified characteristic of the data object.

15. The method of claim 14, wherein the instruction is provided by a database administrator, said database administrator selecting which data object is to be exempt from being cached based on said specified characteristic of the data object.

16. The method of claim 14 further comprising the step of checking a flag corresponding to said requested data object to determine whether the requested data object is to be exempted from being cached, said flag set by said application program that requested the data object.

17. The method of claim 13 further comprising the step of retaining data object which is more likely to be accessed in favor of data object which is seldom used by not caching the seldom used data object at any time.

18. The method as recited in claim 15 wherein said specified characteristic is a type of application program for reading or writing said particular data object.

19. The method as recited in claim 13 wherein said specified characteristic is that the data object is to be shared by multiple clients and applications.

* * * * *

UNITED STATES PATENT AND TRADEMARK OFFICE
CERTIFICATE OF CORRECTION

| | | |
|---|---|---|
| PATENT NO. | : 6,021,470 | Page 1 of 1 |
| APPLICATION NO. | : 08/819673 | |
| DATED | : February 1, 2000 | |
| INVENTOR(S) | : Richard Frank et al. | |

It is certified that error appears in the above-identified patent and that said Letters Patent is hereby corrected as shown below:

Claim 1, column 8, line 40, delete "indicate" and insert --indicates--

Claim 18, column 10, line 55, delete "claim 15" and insert --claim 13--

Signed and Sealed this
Twenty-eighth Day of August, 2012

David J. Kappos
*Director of the United States Patent and Trademark Office*